US005151313A

United States Patent [19]

Takeuchi et al.

[11] Patent Number: 5,151,313

[45] Date of Patent: Sep. 29, 1992

[54] OUTPUT SHEET FOR IMAGE FORMING DEVICE AND IMAGE FORMING DEVICE BY USE OF THE SHEET

[75] Inventors: Tatsuo Takeuchi, Kawasaki; Koji Amemiya, Tokyo, both of Japan

[73] Assignee: Canon Kabushiki Kaisha, Tokyo, Japan

[21] Appl. No.: 539,887

[22] Filed: Jun. 18, 1990

[30] Foreign Application Priority Data

| | | | |
|---|---|---|---|
| Jun. 16, 1989 | [JP] | Japan | 1-154122 |
| Sep. 14, 1989 | [JP] | Japan | 1-238955 |
| Sep. 29, 1989 | [JP] | Japan | 1-255505 |

[51] Int. Cl.[5] .................... B32B 9/00

[52] U.S. Cl. .................... 428/192; 428/195; 428/204; 428/206; 428/323; 428/328; 428/913; 369/52

[58] Field of Search .................... 428/192, 195, 323, 328, 428/913, 204, 206; 369/52

[56] References Cited

U.S. PATENT DOCUMENTS

| | | | |
|---|---|---|---|
| 3,230,874 | 1/1966 | Newman et al. | 428/192 |
| 4,071,362 | 1/1978 | Takenaka | 96/1.4 |
| 4,637,974 | 1/1987 | Kubit | 430/126 |
| 4,656,072 | 4/1987 | Coburn, Jr. et al. | 428/192 |
| 4,873,135 | 10/1989 | Wittnebel et al. | 428/192 |
| 4,971,858 | 11/1990 | Yamano et al. | 428/328 |

FOREIGN PATENT DOCUMENTS

| | | |
|---|---|---|
| 52-03673 | 1/1977 | Japan . |
| 58-105157 | 6/1983 | Japan . |
| 58-106550 | 6/1983 | Japan . |
| 59-7367 | 1/1984 | Japan . |
| 2165045 | 4/1986 | United Kingdom . |

OTHER PUBLICATIONS

Patent Abstracts of Japan, vol. 7, No. 270 (P-240)(1415), Dec. 2, 1983 (JP-A-58150966 (Fuji Xerox) Sep. 7, 1983).

*Primary Examiner*—Patrick J. Ryan

*Attorney, Agent, or Firm*—Fitzpatrick, Cella, Harper & Scinto

[57] ABSTRACT

The present invention concerns output sheet having optical transparency of an image forming device which supports a toner image and then fixes the toner image by passing through a heating fixing device, and an image forming device by use of such sheet. For enabling detection of the conveying state of the sheet at high precision, a colored ink containing metallic powder is printed at a part of the sheet to provide a mark portion for recognition.

29 Claims, 3 Drawing Sheets

OUTPUT SHEET FOR IMAGE FORMING DEVICE AND IMAGE FORMING DEVICE BY USE OF THE SHEET

BACKGROUND OF THE INVENTION

1. Field of the Invention

This invention relates to a recording material to be used for image forming device such as electrophotographic device or electrostatic recording device. Particularly, it relates to a sheet which is the recording material which can be used for the above device for detecting the running situation and presence of the recording material within the device by an optical means, and to an image forming device by use of the sheet.

2. Related Background Art

In the prior art, as the recording material of this kind, there is, for example, a transparent polyethylene terephthalate (PET) film sheet provided for overhead projector (OHP). In an electrophotographic device which passes such PET film sheet as the recording material, for detection of an accident such as paper jamming, etc., for example, a light from a light source is irradiated on the recording material, and presence of the reflected light or presence of the transmitted light is detected by provision of an optical detection means for improving the detection precision or accuracy.

Whereas, a PET sheet permits the light to transmit therethrough and detection with an optical detection means is hardly possible, and therefore various proposals have been made about improvements of the recording material in order to improve the detection precision. For example, Japanese Patent Application Laid-open No. 58-106550 proposes to provide a peelable opaque member at the end of a transparent film. Also, Japanese Patent Application Laid-open No. 58-105157 proposes formation of a coated layer with an opaqueness of 60% or more according to JIS P-8138 in order to sheild the visible light, and further Japanese Patent Application Laid-open No. 59-7367 one having a metal vapor deposited on the whole sheet in order to shield IR-ray.

However, in the case of the prior arts as described above, for example, in the case of providing an opaque member, there was a fear that the recording materials may be obstructed within the electrophotographic device during paper passage due to the stepped difference of the opaque member, or the toner image of the unfixed portion may be disturbed by the paper passage shock by the stepped difference portion. On the other hand, the coating layer for shielding visible light is poor in shielding characteristic against the light of IR level from an LED light source conventionally used as inexpensive light soruce, and the detection time of the signal becomes shorter in the case of further narrower coating width, whereby detection precision with be lowered.

Further, according to metal vapor deposition on the whole sheet, visible light transmittance of the film itself becomes lower, and when it is provided for OHP as the transmissive image, the image will become dark, and moreover, there was a drawback that vapor deposition by use of a vacuum device resulted in increased cost of the film itself.

On the other hand, the transmission type detection means has the light source and the photosensor arranged with an interval apart from each other, whereby the positional precision can be guranteed with difficulty, and also due to unstable detection precision, there have been made proposals to enhance reliability by using a detection means of the reflection type of higher precision, or by using separately the both within one device. However, there existed no transfer material such as transparent sheet, etc. satisfying the both characteristics of reflection and transmission (shielding).

SUMMARY OF THE INVENTION

An object of the present invention is to provide the problems possessed by the output sheet of the prior art as described above.

Also, it is an object of the present invention to provide a technique capable of detecting the mark attached on the sheet with high precision.

Still another object of the present invention is to provide a detection means for the sheet material having solved the above object and an image forming device having such detection means.

The sheet of the present invention accomplishing the above object invention uses a colored ink containing metallic powder at the mark portion for detection. And, so preferable shaped of such metallic powder, scale-like particles are employed.

In the present invention having the above constitution, by printing the opaque portion by use of a metallic powder containing ink obtained by mixing metallic powder into a colored ink for printing, IR-ray having a wavelength of 800 to 1000 nm can be transmitted only at 30% or lower with the ink components, and further a reflectance of 60% or higher is obtained with metallic powder, whereby both shielding and reflection characteristics can be valid.

Also, by making the particles of metallic powder shaped in scales, the area occupied by the metallic powder at the reflection surface can be made larger, whereby reflection characteristic can be improved. Also, by setting the weight ratio of the metallic powder occupied in the metallic powder containing ink at 2 to 30%, lowering in reflection characteristic which may be caused by too low content of metallic powder can be prevented, and also the S/N ratio in the shielding characteristic can be made greater, whereby it becomes possible to prevent generation of erroneous actuations on account of contamination with toner powder within the device and other factors.

DETAILED DESCRIPTION OF PREFERRED EMBODIMENTS

Figure 1A:
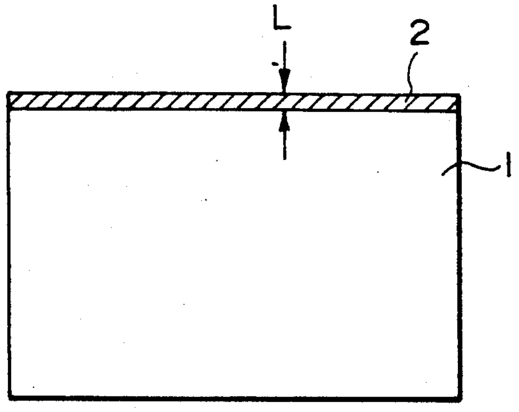
FIGS. 1A to 1D are appearance views showing the recording material according to the first example of the present invention.

Referring now to the examples shown in the drawings, the present invention is described. FIGS. 1A to 1D illustrate the recording material according to an example of the present invention, wherein numeral 1 is a transparent sheet (hereinafter called "film") as the recording material, 2 an opaque portion according to the present invention, which is printed on the transparent film 1 by use of a metallic powder containing ink obtained by mixing metallic powder with a colored ink for printing, corresponding to the detection portion with an optical detection means.

The transparent film 1 is a heat-resistant resin film with the maximum use temperature of 100° C. or higher, and a resin of polyester, polyamide, polyamideimide, etc. may be employed. Particularly polyethylene terephthalate (PET) is preferable with respect to heat resistance and transparency. The film thickness is required to be 50 μm or more so that no wrinkle may be generated by heating during fixing in an electrophotographic device, and preferably 200 μm or less for ensuring transparency. The surface of the transparent film 1 may be also applied with roughening treatment called matting, the antistatic treatment, formation of a coating layer for improvement of fixability, etc., if desired.

Figure 1C:
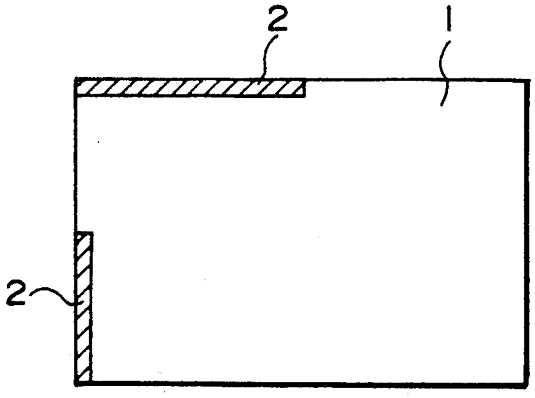
Figure 1B:
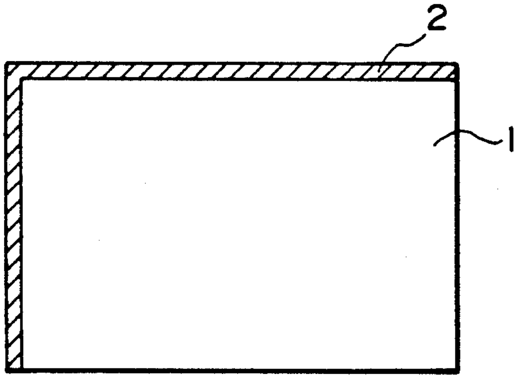

The opaque portion 2, as shown in FIG. 1A to FIG. 1C, is provided along the edge of the transparent film 1, and may be provided, for example, at one side of the four sides as shown in FIG. 1A, or two sides of the four sides as shown in FIG. 1B. Further, although not shown, it can be also formed at three sides or all the four sides. Also, the opaque portion 2, as shown in FIG. 1C may be also provided partially along the edge corresponding to the detection position of the photosensor provided within the electrophotographic device which performs image formation by providing the transparent film 1.

The width L of the opaque portion 2 may be conveniently set depending on the paper passage speed used, but it is required to be at least the thickness of the transparent film employed. For, if it is less than the film thickness, the detection level of the opaque portion 2 by the photosensor becomes equal to the detection level by diffused reflection at the film edge surface, etc., whereby signal can be distinguished from noise with difficulty. Also, the upper limit of the width may be selected adequately with the balance with the image forming width, although the sensitivity of the photosensor can be lowered if it is broader.

Figure 1D:
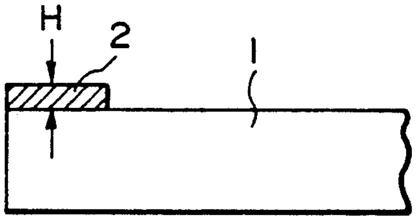

The thickness H of the opaque portion 2 shown in FIG. 1D is 1 μm to 100 μm, preferaly 40 μm or less. If it is more than 100 μm, the image in the vicinity of the opaque portion 2 is affected by the influence from the stepped difference. On the other hand, if if is less than 1 μm, there can be erroneous actuation due to printing irregularity of the opaque portion 2.

Figure 2:
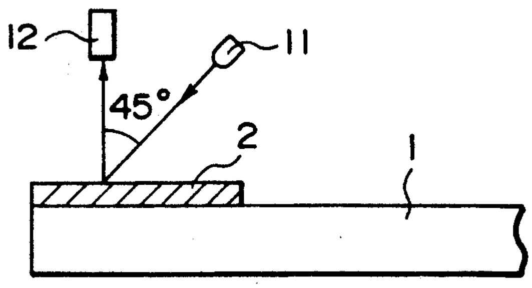
FIG. 2 is an illustration showing the detection state of the recording material shown in FIG. 1.

The reflection and shielding characteristics relative to IR-ray demanded for the material of the opaque portion should be such that the light in the IR-ray region of wavelength 800 to 1000 nm should be transmitted at only 30% or lower, and 60% or more should be reflected by reflection (not normal reflection, but diffused reflection by 45° incident light, as shown in FIG. 2). With a transmittance over 30%, when the window material, surface of the LED 11 which becomes the light source side is contaminated with dust in the air, toner, paper powder, etc. within the device, it becomes difficult to discriminate the level of the signal by printing from that by contamination. Preferably, a transmittance is 10% or less. However, this condition is the case of the measuring condition when the light receiving device exhibits a photocurrent of 304 μA at the peak of 900 nm, when the radiation output is 46 mw/sr (driving current $I_F=50$ mA) by use of LED of 940 nm peak.

For reflection, by use of the LED 11 shown in FIG. 2, the light having the above radiation output and the wavelength is irradiated on the opaque portion 2 on the transparent film 1 as the body to be measured from and angle of 45° , and the diffusion reflection light is measured by the light receiving device (sensor) 12. The reflectance at this time is shown by the ratio of the output by printing of the present invention relative to the output when the body to be measured is a white plain paper. As the reflectance, 60% or more of the reflected light output of the plain paper as described above is preferable, and in the case of printing not satisfying this condition, the reflection noise by the metallic part such as bonded steel plate, etc. within the device and the printing signal can be hardly discriminable from each other, thus causing an erroneous actuation to occur. Further, when an output of 80% or more is obtained, it is more preferable because detection becomes possible even if the distance between the printing surface and the reflection type sensor may more or less change.

As those satisfying the above reflectance and transmittance, there may be included metallic powder containing ink in which metallic powder is mixed into conventional colored ink for printing as described above, such as gravure ink, heating curable type ink, UV-ray curable type ink, etc. In the following, specific examples are described.

The printing ink satisfying the conditions according to the present invention comprise a mixture of a thermosetting resin as represented by polyester resin, acrylic resin, polyolefin resin, polyacetal, polyamide, polystyrene, halo-containing resin, silicon resin, polyether, polycarbonate, vinyl acetate resin, cellulose type resin, and copolymers of these, or a thermosetting resin as represented by single substance or copolymer of phenol resin, xylene resin, petroleum resin, urea resin, melamine resin, unsaturated polyester resin, alkyd resin, epoxy resin, silicon resin, furan resin, etc., mixed with at least one of white, black and further colored pigments and metallic powder of aluminum, gold, copper, silver, palladium, zinc, nickel, tin, etc., which is dissolved in a solvent of the ester type, the ketone type, the alcohol type, etc. and adjusted to a suitable viscosity.

The proportions may be 5 to 30% by weight of the pigment component such as white, black, gray and colored pigments, 2 to 30% by weight of metallic powder, with the balance being the above resin and known auxiliary agents for aiding dispersion of the pigment and metallic powder, based on the total weight of the ink. Also, depending on the curing condition of the ink, there is no problem in containing a catalyst in the heat cure type, and a photoinitiator in the photocure type. Further, for enhancing the strength of the ink, monomer components of resin may be mixed as the curing agent, or for imparting flexible strength to the ink, a polymeric component of resin or a filler having a molecular weight of 10 to 1000-fold of the prepolymer of ink may be also mixed.

To describe next about the content percentage of metallic powder to be used in detail, if the amount of the metallic powder such as aluminum is less than 3% by weight, in the reflection characteristic, no great difference from the black coating internally of the device can be taken, whereby there is only a reflection intensity of 2.5-fold relative to the black coating according to the measuring method as mentioned above and there is possibility of erroneous actuation. Preferably, there should be an amount of 6% by weight mixed. Further, when there is possibility that the distance between the printing portion of the transfer material and the reflection type sensor changes by 50% or more, the amount of metallic powder is required to be made 10% by weight or more. On the other hand, if the metallic powder exceeds 20% by weight, the metallic powder may be dropped off from the printed portion, whereby the device, particularly the photosensitive member, may be internally damaged. However, in the case of the ink containing the filler as described above mixed therein, 30% by weight of metallic powder can be contained in the ink. And, the shape of the metallic powder may be thin, so called scale-shape, with a thickness of 1 μm or less and a width of 5 to some 10 μm to the maximum of about 50 μm.

Next, to describe about the pigment for printing which is the base, it is preferable to use a gray pigment comprising a mixture of a white pigment with Chinese ink or a gray pigment, and when a colored dye or pigment such as yellow, grass color is employed, it is preferably used as a mixture with white or Chinese ink. Also, for intensifying the reflection characteristic, a dye or pigment of purple, indigo, blue, etc. is not so preferred. If it dare be used, metallic powder is required in a slightly larger amount. Also, the pigment which can be used in the above description may be any pigment known in the art as the printing ink without any problem.

The present invention is described in more detail below by way of examples by referring to the components containing metallic powder.

FIRST EXAMPLE

Five kinds of ink containing metallic powder were obtained by mixing a pigment comprising a mixture of a white pigment and Chinese ink pigment at a ratio of 1:8 mixed at the respective ratios into aluminum powder at the respective percentage by weight of 20%, then 12, 10 and 6%, and as Comparative example, 2.0%. The resin of the ink employed is an ink of the UV-ray curable urethane resin type.

Next, onto a PET film with a thickness of 100 μm and a heat-resistant temperature of 150° C. (transparent film 1) was screen printed the above five kinds of ink to a thickness H=15 μm and a printed width L=8 mm, and this was cured by UV-ray from a light pressure mercury lamp. The printed, namely the opaque portion 2 obtained has silver gray color. However, one with 0% of transmission had dark gray color. Table 1 below shows the reflectance and transmission characteristics, and the paper passage tests in an electrophotographic device having an optical detection means comprising an LED 11 (wavelength 980 nm) and a sensor 12.

As shown in Table 1, by mixing of aluminum metallic powder, reflected dose of IR-ray can be increased without lowering the shielding characteristic of IR-ray, whereby both shielding characteristic and reflection characteristic are valid. Besides, the reflectance of IR-light of 800 to 1000 nm is enhanced to 2-fold or more as compared with the case when containing no aluminum powder. Also, it can be understood that not only the transmittance of IR-light can be lowered stably between 1/10 to 1/100 than when using an ink of the white type, but also the shielding ratio is improved by aluminum powder. However, in the case of Examples 1 and 2, erroneous recognition may sometimes occur if the distance from the refection type sensor is deviated by 10%.

TABLE 1

| | Aluminum powder wt % | Reflectance % | Transmittance % | Working state |
|---|---|---|---|---|
| Example 1 | | | | |
| 1-1 | 12 | 92 | 0.1 | O |
| 1-2 | 10 | 88 | 0.1 | O |
| 1-3 | 6 | 70 | 0.2 | O |
| Comparative example | | | | |
| 1 | 2 | 48 | 0.3 | X |
| 2 | 0 | 35 | 0.7 | X |

Column of working state indicates paper passage characteristic.

O: good

X: no paper passage

Reflectance is represented with a paper of 84% of whiteness and 60 seconds of smoothness as being 100%.

SECOND EXAMPLE

By use of 10% by weight of a mixture comprising a 1:1 mixture of a white pigment and a yellow pigment, and mixing therewith 20% of silver powder in terms of percent by weight, and by use of an unsaturated polyester as the resin, sytrene monomer, a accelerator catalyst accelerator, etc. were mixed thereinto to prepare a printing ink (metal containing ink).

Next, on the edge surface of the above PET film (transparent film 1), printing was performed by use of a screen of 200 mesh to a thickness of 30 μm and a width of 8 mm, followed by drying. The printing obtained (opaque portion 2) was gold in color. For the opaque portion 2, the reflection characteristic was measured by use of an IR-LED light of 980 nm, whereby 90% or more of reflectance was exhibited, with the transmittance being 0.05% or less, thus exhibiting good shielding characteristic.

When the transparent film 1 was mounted on an electrophotographic device having optical detection means comprising a sensor 12 forming a pair with the above LED 11 for paper passage test, good results were obtained without any erroneous detection at all. Also, sufficient reflection intensity could be obtained even if the distance between the reflection type sensor and the above printed surface may vary by 20% or more.

THIRD EXAMPLE

With the use of a mixture of white pigment 11 and black pigment 3 as the pigment and aluminum powder as the metal powder, a heat ray curable acrylic resin ink comprising 15% by weight of the pigment and 30% by weight of the metal powder was prepared. Also, in the resin ink was mixed 30% by weight of an amino resin having a molecular weight of 30000 as the filler. This ink was printed by use of a screen of 350 mesh with a thickness of 15 μm and a width of 8 mm on the surface of a PET film coated on the surface with a polyester resin having a melt viscosity at 130° C. of $2\times10^4$ poise to a thickness of 15 μm.

This was also subjected to the same experiments as in the second example, and as the result, a reflectance of 98%, and a transmittance of 0.008% were exhibited, and also the paper passage test was good.

However, when the printed portion was polished with a plain paper, the ink was found to be slightly peeled off. In contrast, by reducing the metal powder by about 1%, there was substantially no peel-off.

When an ink was prepared without change of the ratios of the respective components except for removing the filler from the above printing ink, the strength of the ink after curing was low, and peeling occurred in the thermal fixer in the electrophotographic device. For prevention of this peeling, the content of the metal powder was required to be made 20% or less.

When the metallic powder containing inks shown in the above second and third examples from which the metallic powder was removed were printed similarly on the PET film and subjected to the paper passage test, the ink corresponding to the second example was not detected by either optical detection means of the reflection type and the transmission type. On the other hand, in the ink corresponding to the third example, erroneous actuation was generated in the reflection type.

FOURTH EXAMPLE

With the use of a mixture of white pigment and yellow pigment mixed at 1:1 as the pigment, and mixing copper metal powder therewith to 18% by weight, a printing ink (metal containing ink) was prepared with a vinyl acetate as the resin.

Next, on the end surface on the release paper side of a label paper (transparent film 1) comprising a seal paper and a release paper both consisting of a PET film was printed the ink to a thickness of 17 μm and a width of 8 mm, followed by drying. The printing obtained (opaque portion 2) had a reddish copper color. To the opaque portion 2, reflection characteristics were measured by use of IR-LED ray of 980 nm. As the result, 92% of reflectance was exhibited with transmittance being 0.1%, thus exhibiting good shielding characteristic.

When the paper passage test was conducted by subjecting the transparent film 1 to an electrophotographic device having optical detection means comprising a sensor 12 forming a pair with the same LED 11 as mentioned above arranged at several places, good results were obtained without any erroneous detection at all.

In the above examples, as the recording material sheet, resins films such as PET films were shown as examples, but these are also inclusive of films applied with matting treatment, antistatic treatment, etc., for the purpose of improving conveyability or transferability within the device. Otherwise, as the recording material to which the present invention is applicable, there is a film for transferring the toner image formed on the recording material to an image receiving member by use of label paper or iron.

These recording materials applicable to the present invention are recording materials transmissive to the light source wavelength of the optical sensor which is the means for discriminating the paper and the light transmissive sheet in an electrophotographic device, etc., and the present invention is applicable to all the recording materials satisfying this condition as is apparent from the descriptions in the examples of the present invention.

The present invention has the constitution and the action as described above, and by printing the opaque portion with the use of a metallic powder containing ink obtained by mixing metallic powder into a colored ink for printing, IR-ray having a wavelength of 800 to 1000 nm can be shielded at 70% or more with the ink components, and also a reflectance of 60% or more obtained with the metallic powder to give both shielding characteristic and reflection characteristic, whereby a transmissive sheet capable of corresponding to both the transmission and reflection types by use of IR-ray can be prepared, and since IR-ray inherently receives influence from external light with difficulty, it becomes possible to effect detection with higher reliability in an electrophotographic device where contamination with powder, etc., is liable to occur.

Also, reflectance of IR-ray can be enhanced by mixing with metallic powder, and the opaque portion can be prepared more simply and at lower cost as compared with, for example, metallic vapor deposition of the prior art.

Further, since the opaque portion is formed by printing, the stepped difference can be set at the minimum level on the transmissive sheet to give excellent paper passage characteristic.

By making the particles of metallic powder shaped in scales, the area occupied by the metallic powder on the reflection surface can be made larger, whereby reflection characteristic can be improved. Also, by setting the weight ratio of the metallic powder in the metallic powder containing ink at 2 to 30%, it is possible to prevent lowering in reflection characteristic caused by too small amount of metallic powder, or drop-off of the metallic powder from the printed opaqeu portion caused by too much amount of powder. Further, by mixing a polymer having a molecular weight which is 10 to 1000-fold as compared with the prepolymer of the resin in the resin which plays the role as the binder of ink, the printing strength is increased to enable increase of the metallic powder content, whereby both reflection and shielding characteristics can be stabilized.

Whereas, by use of an ink containing metallic powder mixed therein, when, for example, defective conveyance may sometimes occur in the course of receiving such action as charging from the printing side in an electrophotographic device and yet the material to be conveyed thrusted into the charger, current may sometimes leaked through printing even leading to fuming of the printed portion by heat generation. To cope with such problem, the electrical resistivity of the ink which becomes the mark portion is not lowered so much. For example, it is effective to set the electrical resistivity of ink to a value approximate to the electrical resistivity of the sheet surface.

In the following, examples by taking such electrical resistivity into consideration are described in detail.

FIFTH EXAMPLE

FIG. 3 illustrates a transfer material according to the fifth example of the present invention, wherein those having the same functions as in the above examples are affixed with the same symbols. Numeral 1 in the Figure is a transparent film as the transfer material, 2 the opaque portion according to the present invention, which is printed on the transparent film 1 by use of a metallic powder containing ink obtained by mixing metallic powder into a colored ink for printing, corresponding to the detection portion by an optical detection means. As the transparent film 1, those of the above examples are applicable.

Figure 3A:
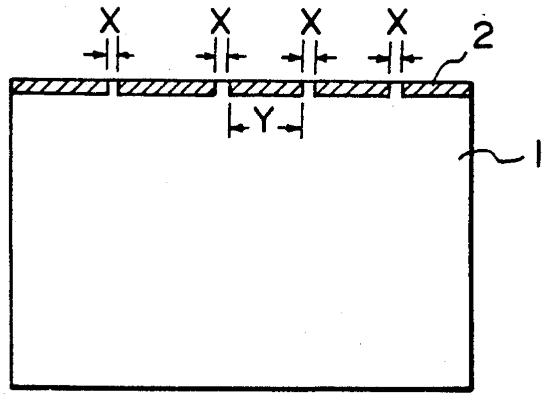
FIGS. 3A to 3D are appearance views showing the transmissive sheet according to the first example of the present invention.
Figure 3B:
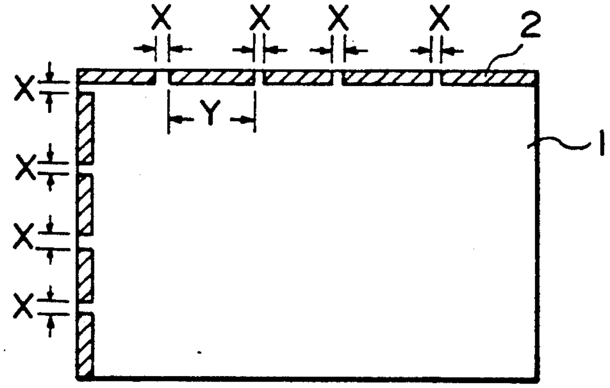
Figure 3C:
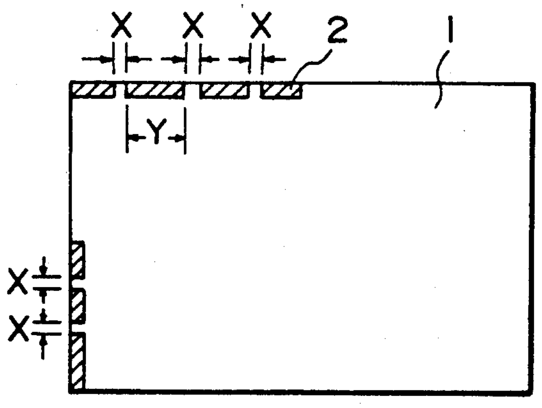

The opaque portion 2, as shown in FIG. 3A to FIG. 3C, is provided along the edge of the transparent film 1, and may be provided, for example, at one side of the four sides as shown in FIG. 3A, or at two sides of the four sides as shown in FIG. 3B. Further, although not shown, it may be also provided at three sides or all of the four sides. Also, the opaque portion 2 may be provided partially along the edge corresponding to the detection position of the photosensor provided within the electrophotographic device which performs image formation by providing the transparent film 1, as shown in FIG. 3C. However, practically printing is commonly performed from end to end on one side, partially because of appearance including the printed portion of the transparent film 1, etc. At this time, for example, by utilizing other portions which actuates the optical sensor, LOGO such as note or arrowhead during paper passage of the transparent film through the electrophotographic device is written.

When metal powder is contained in the printing ink, the transparent film 1 used which becomes its base generally has a surface resistivity of about $10^8$ to $10^{14}$ ohm·cm. As the material to be used for the base material, PET in general has its surface resistivity of $10^{16}$ ohm·cm. This is because antistatic treatment for prevention of disturbance of toner image on the transfer material by electrostatic charges caused by such factor as corona, etc. used during image formation within the electrophotographic device is applied. Also, in a transfer material to be applied for an electrophotographic device which forms a color image by use of a multiple transfer device which transfer toner images on a photosensitive drum successively repeatedly, also because the electrostatic charges accumulated on the transfer material are increased, a film with relatively lower surface resistivity of $10^8$ to $10^{10}$ ohm·cm is used.

Whereas, when the surface resistivity is measured under the printing state where the optical system jam detecting sensor within the electrophotographic device as described below can be normally actuated, it was confirmed to fall within the range of from $10^5$ to $10^9$ ohm·cm. However, when printing is effected with the resistivity shown by this resistivity value, for example, in the course of receiving the action of charging, etc. from the printing side within the electrophotographic device, defective conveyance occurs and yet the materials thrusts into the charger, the current is leaked through printing sometimes leading to fuming by heat generating at the printing portion, as described in the prior art example.

Accordingly, in the present invention, when the surface resistivity of the printing portion to be printed partially on the film surface is lower than the surface resistivity of the film, a printing pattern is used comprising a printing portion which is substantially equal to the surface resistivity of the film and an electrically conductive portion.

In the Figure, X is the portion with surface resistivity equal to that of the film which is, for example, a portion without printing. Y is the portion printed with the metal powder containing ink to be used in the present invention. Whereas, the inventors have found as the result of investigation about the relationship with the surface resistivity of printing in the case when the current is leaked through the printing portion as described above that there is no problem if the surface resistivity is $10^8$ ohm·cm or higher. Accordingly, the surface resistivity of printing which can sufficiently make avail of the present invention is $10^8$ ohm·cm or higher. When the width of the portion equal in surface resistivity to the film which divides the printing portions based on the result is determined, it may be said to be 1 mm or more when the surface resistivity of the film is $10^8$ ohm·cm. Similarly, when the surface resistivity of the film is $10^9$ ohm·cm, it can be understood that an interval of 0.1 mm or more may be taken. However, in practical application, it is preferable to take a distance 3 to 5-fold of this value for the purpose of security.

Meanwhile, the printing portion according to the present invention is required to actuate normally photosensor within the electrophotographic device. The width L between the printing portion and the opaque portion 2 may be set conveniently depending on the paper passage speed and the sensitivity of the photosensor, but is required to be at least the thickness of the transparent film employed. For, with a thickness lower than the film thickness, the detection level of the opaque portion 2 becomes equal to the detection level by diffused reflection at the film end surface, etc., whereby signal can hardly be distinguished from noise. On the other hand, the upper limit of the width L may be selected adequately in view of the balance with the image forming width, although the sensitivity of the photosensor can be made lower as the width is broader.

Figure 3D:
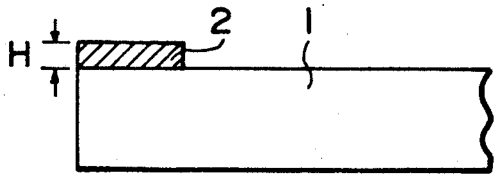

The thickness of the opaque portion 2 shown in FIG. 3D may be 1 μm to 100 μm, preferably 40 μm or less. If it is more than 100 μm, the image in the vicinity of the opaque portion 2 is affected due to the influence by the stepped difference. On the other hand, if it is less than 1 μm, there can be erroneous actuation due to printing irregularity of the opaque portion 2.

Further, when current passage was effected for one second with one end of the printing portion located on the earth and the other connected to AC of 10 kvpp, there was no fuming, etc.

SIXTH EXAMPLE

By use of 10% by weight of a mixture of white pigment and yellow pigment mixed at 1:1 as the base pigment, silver powder was mixed therewith to 20% by weight, and an unsaturated polyester was used as the resin and styrene monomer, polymerization catalyst accelerator, etc. were mixed therewith to prepare a printing ink (metal containing ink).

Next, on the end surface of a PET film used in the foregoing first example 1 (transparent film 1), printing was performed by use of a screen of 200 mesh to a thickness of 30 μm, a width of 8 mm and a distance between printing of 1 mm, followed by drying. The printing obtained (opaque portion 2) was gold in color, and the surface resistivity of the printing $10^6$ ohm·cm. When the reflection characteristic was measured for the opaque portion 2 by use of an IR-LED ray of 980 nm, 90% or more of reflectance was exhibited, with transmittance being 0.05%, thus exhibiting good shielding characteristic.

When the transparent film 1 was subjected to an electrophotographic device having optical detection means comprising a sensor 12 forming a pair with the above LED 11 at several places for paper passage test, good results were obtained without any erroneous detection at all. Also, even when the distance between the reflection type sensor and the above printing surface may vary by 20% or more, sufficient reflected light intensity was obtained. Further, no fuming, etc. occurred even when one end of the printing portion was located at the earth, and the other end connected to AC of 10 kvpp.

SEVENTH EXAMPLE

With the use of a mixture of white pigment 11 and black pigment 3 as the pigment, aluminum powder as the metallic powder, a heat-ray curable acrylic resin ink was prepared with 15% of the pigment and 30 % by weight of the metallic powder. Also, 30% by weight of an amino resin having a molecular weight of 30000 was mixed as the filler in the resin ink. The ink was coated by use of a screen of 350 mesh on the surface of a PET film with a surface resistivity of $10^{10}$ ohm·cm coated with a polyester resin with a melt viscosity at 130° C. of $2\times10^4$ poise to a thickness of 15 μm, a width of 8 mm and a distance X between printing of 1 mm. The surface resistivity of printing at this time was found to be $10^7$ ohm·cm. When this was subjected to the same test as in the first example and the second example, a reflectance of 98% and a transmittance of 0.008% were exhibited, and also the paper passage test was good. Further, no fuming, etc. occurred when current was passed for one second with the one end of the printing portion located on the earth, and the other end connected to AC of 10 kvpp.

EIGHTH EXAMPLE

With the use of a mixture of white pigment and yellow pigment mixed at 1:1 as the pigment, and mixing 20% by weight of the pigment and 18% by weight of copper metal powder therewith, a printing ink (metal containing ink) was prepared with a vinyl acetate as the resin.

Next, on the end surface on the release paper side of a label paper (transparent film 1) comprising a seal paper and a release paper both consisting of a PET film was printed the ink to a thickness of 17 μm and a width of 8 mm, followed by drying. The printing obtained (opaque portion 2) has a reddish copper color. The printing portion has a surface resistivity of $10^7$ ohm·cm. For the opaque portion 2, reflection characteristics are measured by use of IR-LED ray of 980 nm. As the result, 92% of reflectance was exhibited with transmittance being 0.1%, thus exhibiting good sheilding characteristic.

When the paper passage test was conducted by subjecting the transparent film 1 to an electrophotographic device having optical detection means comprising a sensor 12 forming a pair with the same LED 11 as mentioned above arranged at several places, good results were obtained without any erroneous detection at all. Further, no fuming, etc. occurred when current was passed for one second with one end of the printing portion located on the earth and the other end connected to AC of 10 kvpp.

From the fifth to eighth examples as described above, when the surface resistivity of the printing portion to be printed on a part of the film surface is lower than the surface resistivity of the film, by making a pattern comprising a portion with a surface resistivity substantially equal to that of the film and a printing containing metallic powder, the following inconveniences can be prevented. That is, in a transfer material for recording, by the printing portion which has a printing pattern having insulating property to the electrical device arranged in the conveying route from the paper feeding to the paper discharging within the image forming device, defective conveyance is generated in the course of receiving of charging, etc. from the printing side within the electrophotographic device, and in such case when the material is thrusted into the charger, the current is leaked through printing and fuming may sometimes occurs by heat generation of the printing portion. Further, a recording material for image forming device capable of corresponding to the reflection type sensor and the transmission type sensor of the optical system jam detection sensor arranged in the conveying route within the image forming device can be provided.

In the following, an example of the image forming device to which the above film is applicable is to be described.

Figure 4:
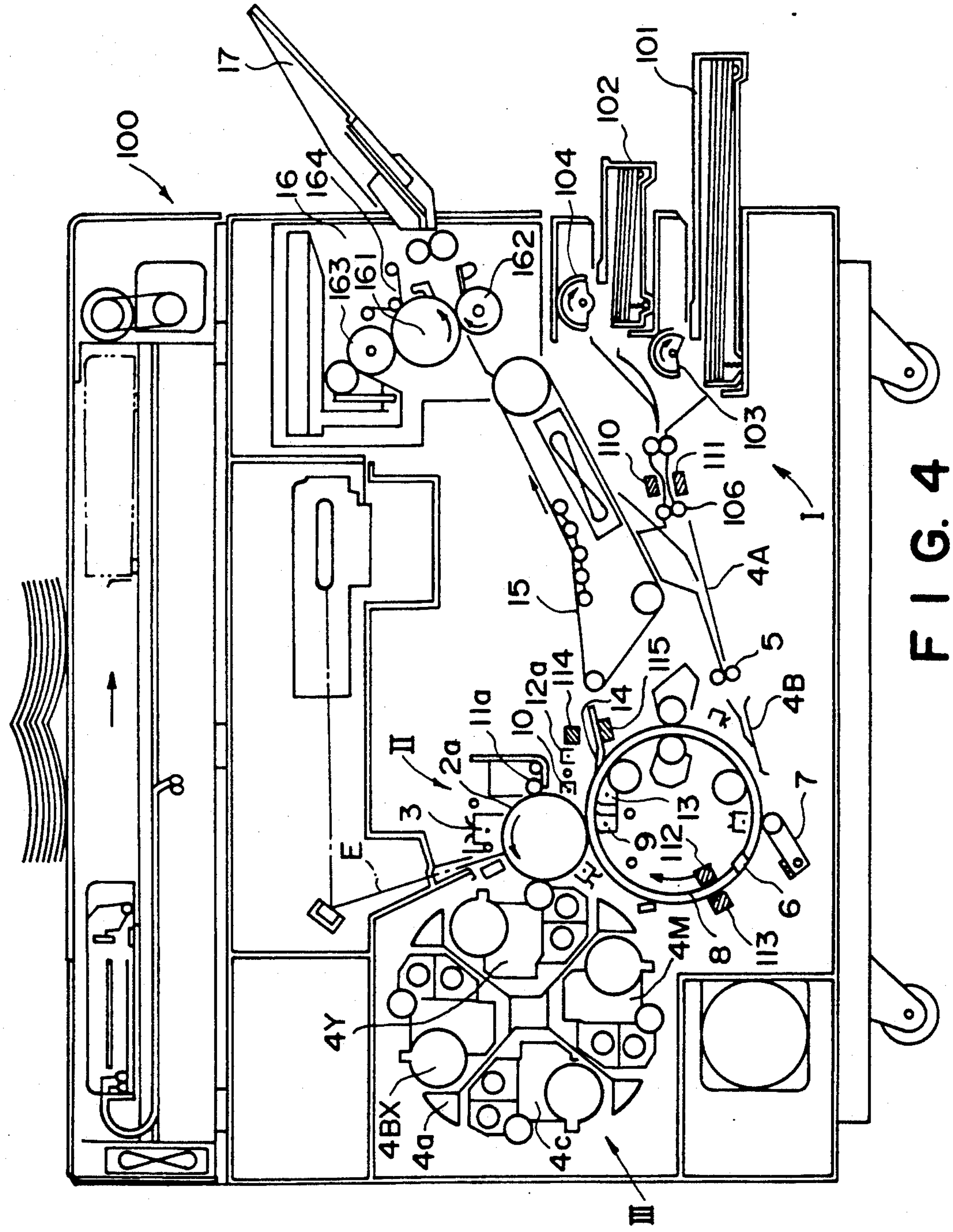
FIG. 4 shows a sectional view of the electrophotographic copying device which is an example of the image forming device to which the present invention is applicable.

FIG. 4 shows schematically a sectional view of the electrophotographic device capable of forming a full color image as the forming device to which the film of the present invention is applied. In the Figure there are broadly classified the recording material conveying system I provided from the right side of the main device 100 to approximately the center of the main device, the latent image forming portion II provided near the transfer drum constituting the above recording material conveying system I at approximately the central portion of the main device 100, and the developing means arranged near the above latent image forming portion II (namely the rotatory developing device III).

The recording material conveying system I as mentioned above has trays 101 and 102 for feeding recording material freely detachable relative to the opening formed on the right side (right side in FIG. 1) of the above main device 100, rollers 103 and 104 for paper feeding arranged approximately immediately above said trays 101 and 102, paper feeding guides 4A, 4B equipped with the paper feeding roller 106 arranged near the rollers for paper feeding 103 and 104. The transfer drum 8 provided in the vicinity of the above paper feeding guide 4B has the roller for contact 7, the gripper 6, the deelectrifier 12*a* for separation of the recording material, the separation nail or paw 14 arranged from the upstream side to toward the downstream side of the rotational direction in the vicinity of its outer peripheral surface, and also the transfer charger 9, the deelectrifier for separation of recording material 13 arranged within the inner peripheral side. Further, it comprises the conveying belt means 15 provided near the above separation nail 14, and the fixer 16 near the tray for discharging freely detachable relative to the main device 100 extending outwardly of the main device 100 arranged near the conveying direction terminal end side of said conveying belt means 15.

The above latent image forming portion II has an image carrying member with its outer peripheral surface arranged in contact with the outer peripheral surface of the above transfer drum 8 and also freely rotatable in the arrowhead direction in FIG. 4 (namely the photosensitive drum 2*a*), a deelectrifier 10 arranged from the upstream side to the downstream side in the rotation direction of said photosensitive drum 2 in the vicinity of the outer peripheral surface of said photosensitive drum 2*a*, a cleaning means 11*a*, a primary charger 3 and an exposure means such as laser beam scanner for forming electrostatic latent images on the outer peripheral surface of the above photosensitive drum 2*a*, and an exposure portion from an image exposure reflection means such as a polygon mirror. The above rotatory developing device III has a freely rotatable case member (hereinafter called "rotary member") 4*a*, a yellow developer 4Y, the magenta developer 4M, the cyan developer 4C and the black developer 4BK mounted respectively on said rotatory member 4*a* and constituted so as to visualize (namely develop) electrostatic images formed on the outer peripheral surface of the above photosensitive drum 2*a* at the position opposed to the outer peripheral surface of the above photosensitive drum 2*a*.

The sequence of the image forming device as a whole with the constitution as described above is explained by referring to an example in the case of full color mode. When the photosensitive drum 2*a* as described above rotates in the arrowhead direction in FIG. 1, the photosensitive material on said photosensitive drum 2*a* is charged uniformly by the primary charger 3. When uniform charging is effected to the photosensitive material with the primary charger 3, image exposure is effected with the laser beam E modulated by the yellow image signal, whereby electrostatic images are formed on the photosensitive member 2*a* and the above electrostatic latent images are developed by the yellow developer 4Y fixed previously at the developing position by rotation of the rotary member 4*a*.

On the other hand, when the recording film according to the present invention is a film, it is conveyed toward the paper feeding roller 106 from the trays for feeding 101 or 102 by the respective rollers 103, 104 for feeding. In the conveying route, a photosensor as the photodetection means, and in the drawing, a transmission type photosensor equipped with a LED light source (emitting device) 110 and a light receiving device 111 comprising a phototransistor is provided. The sheet passes between the light source 110 and the light receiving device 111, and during the passage, presence of the film is judged depending on whether the light from the light source 110 is shielded or not. When it is judged that the film is conveyed under normal state, the film is held by the gripper 6 of the transfer drum at a predetermined timing via the paper feeding roller 106, the paper feeding guide 4A and the paper feeding guide 4B, and wound up electrostatically on the transfer drum 8 by the roller 7 for contact and the electrode opposed to said roller for contact 7. However, when it is judged that the film is not under the normal state, actuation of the device will automatically be stopped.

Also, a photosensor for judging whether the wound up film is on the transfer drum 8 at the correct position is arranged by the combination of the light source 113 and the light receiving device 112, and here the transfer drum will continue to rotate, if the film is judged to be under normal wound-up state.

The transfer drum 8 rotates in the arrowhead direction in FIG. 4 as synchronized with the photosensitive drum 2*a*, and the sensible image developed by the yellow developer 4 is transferred onto the film by the transfer charger 9 at the area where the outer peripheral surface of the above photosensitive drum 2*a* is in contact with the outer peripheral surface of the above transfer drum 8. The transfer drum 8 continues to rotate as such to be prepared for transfer of the next color (magenta in FIG 4).

On the other hand, the photosensitive drum 2*a* is deelectrified by the above charger for deelectrification 10, cleaned by the cleaning means 11*a*, and then again charged by the primary charger 3, and receives image exposure as described above from the next magenta image signal. The above rotatory developing device rotates when an electrostatic latent image with the magneta image signal is formed on the photosensitive drum 2*a* by the above image exposure to fix the magenta developer 4M at the predetermined position as described above to effect a predetermined magenta developing. Subsequently, the process as described above is practiced also for cyan color and black color, and on completion of transfers corresponding to four colors, the multi-color sensible image is deelectrified by the respective deelectrifiers 12*a*, 13, whereby grippage of the film by the above gripper is released and also said film is separated from the transfer drum 8 by the separation nail 14. Also, in this case, by judging whether separation has been done normally by the photosensor comprising the light source 115 and the light receiving device 114 similarly as described above, the film is sent to the fixer by the conveying belt when it was separated normally to be fixed by heat and pressure to complete a series of full color print sequence, thereby forming a full color print image on the film.

The fixer 16 is equipped a heating fixing roller 161, a pressurizing roller 162 and a coating means 163 for feeding silicone oil to the heating fixing roller 161. The heating fixing roller 161 should preferably have a surface layer having excellent release characteristic such as silicone rubber. Also, the surface layer of the pressurizing roller 163 should preferably be formed of a fluorine type resin.

In the device as described above, detection of the position was possible at high precision in the film to which the present invention has been applied.

We claim:

1. An output sheet of an image forming device, comprising:

an output sheet having optical transparency;

a marked portion for recognition provided at an edge part of the sheet, said mark being formed by printing with a colored ink having metallic powder, wherein the marked portion of the sheet has different optical properties than the unmarked portion of the sheet, which differences are detectable by light.

2. An output sheet according to claim 1, wherein said metallic powder of mark consists of scale-like particles.

3. An output sheet according to claim 2, wherein said scale-like metallic powder of mark has a thickness of 1 μm or less, a width of 5 to 50 μm, preferably 5 to 10 μm.

4. An output sheet according to claim 2, wherein said ink comprises 2 to 30% by weight of the metal powder.

5. An output sheet of an image forming device, comprising:

an output sheet having optical transparency;

a marked portion for recognition printed in a shape of a band at an edge side of the sheet, said mark being formed by printing with a colored ink having metallic powder, wherein the marked portion of the sheet has different optical properties than the unmarked portion of the sheet, which differences are detectable by light and wherein said marked portion is capable of being detected by a light emitting detector of an image forming apparatus.

6. An output sheet according to claim 1, wherein said marked portion has a thickness of 1 μm to 100 μm, preferably 1 μm to 40 μm.

7. An output sheet according to claim 5, wherein said sheet is a transparent resin film, having a thickness of 50 μm to 200 μm, and a width of the marked portion shaped in a band is not smaller than the thickness of the sheet.

8. An output sheet according to claim 1, wherein said marked portion has an electrical resistivity value similar to the surface resistivity of the sheet portion.

9. An output sheet according to claim 8, wherein said sheet portion has a surface resistivity of $10^8$ to $10^9$ ohm·cm.

10. An output sheet of an image forming device which bears a toner image and then fixing the toner image by passing it through a heating-fixing device, comprising:

an output sheet having optical transparency, a marked portion for recognition provided at an edge part of the sheet, said mark being formed by printing with a colored ink having metallic powder, wherein the marked portion of the sheet has different optical properties than the unmarked portion of the sheet, which differences are detectable by light.

11. An output sheet according to claim 10, wherein said metallic powder of mark consists of scale-like particles.

12. An output sheet according to claim 11, wherein said scale-like metallic powder of mark has a thickness of 1 μm or less, a width of 5 to 50 μm, preferably 5 to 10 μm.

13. An output sheet according to claim 11, wherein said ink comprises 2 to 30% by weight of the metal powder.

14. An output sheet of an image forming device which bears a toner image and then fixes the toner image by passing it through a heating-fixing device, comprising:

an output sheet having optical transparency;

a marked portion for recognition printed in a shape of a band at an edge side of the sheet, said mark being formed by printing with a colored ink having metallic powder, wherein the marked portion of the sheet has different optical properties than the unmarked portion of the sheet, which differences are detectable by light and wherein said marked portion is capable of being detected by a light emitting detector of an image forming apparatus.

15. An output sheet according to claim 10, wherein said marked portion has a thickness of 1 μm to 100 μm, preferably 1 μm to 40 μm.

16. An output sheet according to claim 14, wherein said sheet is a transparent resin film having a thickness of 50 μm to 200 μm, and a width of the marked portion shaped in a band is not smaller than the thickness of the sheet.

17. An output sheet according to claim 10, wherein said marked portion has an electrical resistivity value similar to the surface resistivity of the sheet portion.

18. An output sheet according to claim 17, wherein said sheet portion has a surface resistivity of $10^8$ to $10^9$ ohm·cm.

19. An image forming device using an optically transparent output sheet, comprising:

an output sheet having a marked portion for recognition at an edge part of the sheet;

a convey means for conveying the sheet within the main device; and a detection means arranged within the conveying route for reading the marked portion of the sheet conveyed;

wherein said marked portion is formed by printing with a colored ink containing metallic powder, and wherein the marked portion of the sheet has different optical properties than the unmarked portion of the sheet, which differences are detectable by light.

20. An image forming device according to claim 19, wherein said detection means which consists of said light source and a light-receiving means.

21. An image forming device according to claim 20, wherein said metallic powder of said mark consists of scale-like particles.

22. An image forming device according to claim 21, wherein the scale-like metallic powder of said mark has a thickness of 1 μm or less, a width of 5 to 50 μm, preferable 5 to 10 μm.

23. An image forming device according to claim 22, wherein the ink comprises 2 to 30% by weight of the metallic powder.

24. An image forming device using an optically transparent output sheet, comprising:

an output sheet having a marked portion for recognition printed in a shape of a band at an edge side of the sheet;

a convey means for conveying the sheet within the main device; and a detection means arranged within the conveying route for reading the marked portion of the sheet conveyed;

wherein said marked portion is formed by printing with a colored ink containing metallic powder, and wherein the marked portion of the sheet has different optical properties than the unmarked portion of the sheet, which differences are detectable by light and wherein said marked portion is capable of being detected by a light emitting detector of an image forming apparatus.

25. An image forming device according to claim 19, wherein a main body of the device has a transfer means for transferring toner image onto said sheet material and a fixing means for fixing the toner image transferred.

26. An image forming device according to claim 25, wherein said fixing means has a heating roller, and said mark portion has a thickness of 1 μm to 10 μm, preferably 1 μm to 40 μm.

27. An image forming device according to claim 19, wherein said main body of the device has a transfer means for transferring toner image onto said sheet material by an electrical field, said sheet portion has a surface resistivity of $10^8$ to $10^{10}$ ohm·cm, and the marked portion is made to have an electrical resistivity value similar to the surface resistivity.

28. An image forming device according to claim 19, wherein the main body of the device transfers toner images onto the same sheet material overlappingly by plural times.

29. An image forming device according to claim 24, wherein the main body of the device outputs a color image by transferring toner images onto the same sheet material overlappingly by plural times.

* * * * *

UNITED STATES PATENT AND TRADEMARK OFFICE
CERTIFICATE OF CORRECTION

PATENT NO. : 5,151,313

DATED : September 29, 1992

INVENTOR(S) : TATSUO TAKEUCHI, ET AL.

It is certified that error appears in the above-identified patent and that said Letters Patent is hereby corrected as shown below:

COLUMN 1

Line 38, "sheild" should read --shield--.
Line 40, "one having" should read --has--.
Line 53, "soruce," should read --source,--.
Line 66, "guranteed" should read --guaranteed--.

COLUMN 2

Line 21, "so preferable shaped" should read --as preferable shapes--.

COLUMN 3

Line 43, "preferaly" should read --preferably--.
Line 65, "mw/sr" should read --mW/sr--.

COLUMN 4

Line 2, "and" should read --an--.
Line 3, "45° ," should read --45°,--.
Line 28, "comprise" should read --comprises--.

COLUMN 5

Line 47, "printed," should read --printed portion,--.
Line 67, "refection" should read --reflection--.

COLUMN 6

Line 26, "sytrene" should read --styrene-- and "a" should read --an--.

UNITED STATES PATENT AND TRADEMARK OFFICE
CERTIFICATE OF CORRECTION

PATENT NO. : 5,151,313

DATED : September 29, 1992

INVENTOR(S) : TATSUO TAKEUCHI, ET AL.

It is certified that error appears in the above-identified patent and that said Letters Patent is hereby corrected as shown below:

COLUMN 7

Line 14, "and" should read --or--.

COLUMN 8

Line 25, "opaqeu" should read --opaque--.
Line 38, "thrusted" should read --is thrust--.
Line 39, "leaked" should read --leak--.

COLUMN 9

Line 61, "of" should read --if--.

COLUMN 11

Line 37, "sheilding" should read --shielding--.
Line 64, "thrusted" should read --thrust--.
Line 65, "occurs" should read --occur--.

COLUMN 12

Line 32, "paw" should read --pawl--.
Line 51, "drum 2" should read --drum 2a--.

COLUMN 14

Line 12, "a" should read --with a--.
Line 26, "transparency;" should read --transparency; and--.
Line 35, "mark" should read --said mark--.
Line 37, "mark" should read --said mark--.
Line 38, "less," should read --less and--.

UNITED STATES PATENT AND TRADEMARK OFFICE

CERTIFICATE OF CORRECTION

PATENT NO. : 5,151,313

DATED : September 29, 1992

INVENTOR(S) : TATSUO TAKEUCHI, ET AL.

It is certified that error appears in the above-identified patent and that said Letters Patent is hereby corrected as shown below:

COLUMN 14

Line 43, "transparency;" should read --transparency; and--.
Line 68, "fixing" should read --fixes--.

COLUMN 15

Line 3, "transparency," should read --transparency; and--.
Line 11, "mark" should read --said mark--.
Line 14, "mark" should read --said mark--.
Line 15, "less," should read --less and--.
Line 24, "transparency;" should read --transparency; and--.

COLUMN 16

Line 5, "which" should be deleted.
Line 12, "less," should read --less and--.

Signed and Sealed this

Twenty-sixth Day of October, 1993

Attest:

BRUCE LEHMAN

*Attesting Officer*

*Commissioner of Patents and Trademarks*